D. Burbank,
Bee Hive.

No. 96,668. Patented Nov. 9, 1869.

Witnesses:
L. Hailer
P. T. Dodge

Inventor:
D. Burbank
by Dodge & Munn
Attorney

United States Patent Office.

D. BURBANK, OF LEXINGTON, KENTUCKY.

Letters Patent No. 96,668, dated November 9, 1869.

---

IMPROVEMENT IN BEE-HOUSE.

---

The Schedule referred to in these Letters Patent and making part of the same.

---

*To all whom it may concern:*

Be it known that I, D. BURBANK, of Lexington, in the county of Fayette, and State of Kentucky, have invented certain new and useful Improvements in Bee-Houses; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to bee-houses; and consists in constructing and arranging them in a novel manner.

In the drawings—

The object of my invention is to combine, in a cheap and convenient form, all the advantages of double hives for winter or summer use, as well as those of a bee-house, and, at the same time, avoid the disadvantages of the ordinary bee-house and double hives.

While my bee-house is specially designed for the use of what are known as Langstroth's movable comb-hives, it is also suitable for the use of any kind of hives.

I construct it in rectangular form, and out of any suitable materials, making it large enough to contain four or more hives, and mount it on posts $a$.

The sides A, I line with roofing-paper, saturated with asphaltum, if desired, as shown in red lines in both figures, to make them tight and warm.

Figure 1:
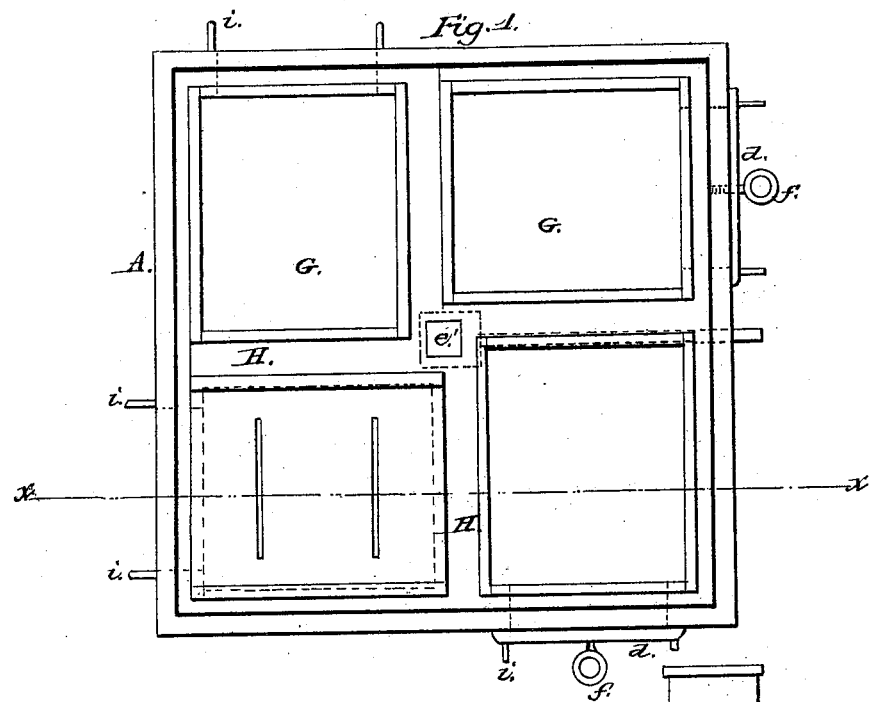
Figure 1 is a horizontal section on the line $y\ y$ of fig. 2.
Figure 2:
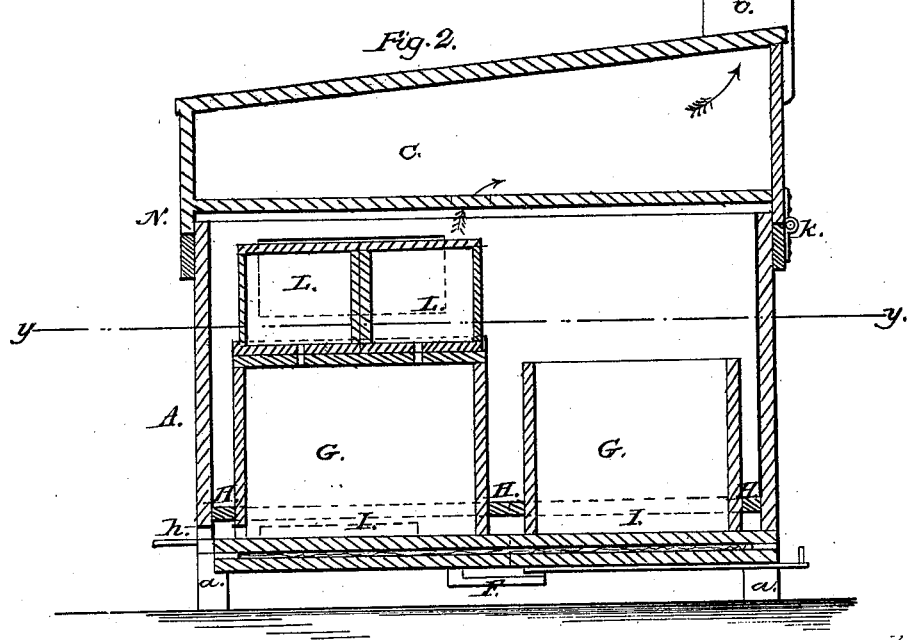
Figure 2 is a vertical section on the line $x\ x$ of fig. 1.

The floor I make hollow, by the use of an upper floor I, as seen in fig. 2.

The top or roof I also make hollow by providing it with a chamber C, as shown in the same figure.

This roof I hinge at K, so that it may be turned up, in order to obtain convenient access to the interior when desired for any purpose, and also provide it with a ventilator, $v$.

In the centre of the bottom of the house, I make an opening, $e$, which I provide with a slide, F, so arranged as to admit more or less air, as desired, for the purposes of ventilation.

In the upper floor I is a corresponding opening, to allow the upper passage of the air.

Within this house I place four or more hives, G, separating them from each other, and from the sides of the house, by an arrangement of strips, H, placed a short distance from the upper floor, as shown in fig. 2, to allow an air-space below them, and also provided with an opening, $e'$, for the passage of air.

The hives G I arrange so that their entrances, $h$, may be in different sides of the house, in order that the young queens, when returning from their flight, may not enter into the wrong hive.

I construct the entrances through the sides of the house, so that they may be kept open or closed, as desired. This may be done in various ways.

One very simple and convenient method is to place a pin, $i$, horizontally, on each side of the opening $h$, and on them rest-boards $d$, provided with thumb-screws $f$, or other suitable device, for securely fastening them over the openings.

These can be conveniently removed or firmly secured, as desired.

In one side of the house, and near the top, I make a window, N, providing it with a sliding door or blind, so that a person from the outside may look into the house, and may also shut out the light after he has seen all that he desired.

In order to secure greater uniformity of temperature throughout the house, the double floors and top may be filled with chaff, shavings, or other light or suitable material.

As access can be had to the upper part of the house by means of the removable or hinged top C, or through the window N, it is obvious that boxes L can be conveniently placed upon the hives G, for storing the surplus honey, and may be as conveniently removed.

A bee-house constructed in this way possesses many advantages.

By means of the opening in the bottom, just such a quantity of air as is required, having reference to the comfort and health of the bees, may be admitted.

This air, in its passage through the house, will fill all the air-spaces about the hives, and finally escape through the chamber C and ventilator $v$. While in the house, it will be warmed more or less by the natural warmth of the bees, and in this way will assist in protecting them from the cold in winter.

The chamber C, above, will be found to answer many useful purposes, besides adding to the protection of the bees in severe weather, it may be used as a feeding place for them, if, at any time, it should become necessary, and will also serve as a dark chamber, where surplus queens can be kept in nucleus boxes.

While my bee-house possesses these advantages for wintering bees, it will be found to possess no less advantages for their summer use, as the double top and bottom, in connection with its system or arrangement for ventilation, protects the hives against extreme warm weather, by securing an even temperature.

Having thus described my invention,

What I claim, is—

1. A bee-house, having its sides lined with a waterproof material, its floor or bottom double, with an opening and slide to admit air for ventilation, and with its top or roof removable, and provided with a chamber and with a ventilator, all constructed and arranged substantially as herein described.

2. In combination with a bee-house thus constructed, the hives G and strips H, with the devices for ventilation, and entrances for the bees, all constructed and arranged substantially as herein described.

D. BURBANK.

Witnesses:
C. H. TOMPKINS,
T. G. HARKINS.